United States Patent
Sanguinetti

(10) Patent No.: US 8,660,501 B2
(45) Date of Patent: Feb. 25, 2014

(54) WIRELESS COMMUNICATIONS CIRCUITRY WITH SIMULTANEOUS RECEIVE CAPABILITIES FOR HANDHELD ELECTRONIC DEVICES

(75) Inventor: Louie J. Sanguinetti, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 13/053,105

(22) Filed: Mar. 21, 2011

(65) Prior Publication Data

US 2011/0194546 A1    Aug. 11, 2011

Related U.S. Application Data

(63) Continuation of application No. 11/636,879, filed on Dec. 11, 2006, now Pat. No. 7,933,561.

(51) Int. Cl.
*H04B 1/44* (2006.01)

(52) U.S. Cl.
USPC .............................. 455/78; 455/41.2; 370/338

(58) Field of Classification Search
USPC .................................. 455/41.2, 78; 370/338
See application file for complete search history.

(56) References Cited

U.S. PATENT DOCUMENTS

| | | | |
|---|---|---|---|
| 4,010,426 A | 3/1977 | Rambo | |
| 5,301,367 A | 4/1994 | Heinonen | |
| 5,386,203 A | 1/1995 | Ishihara | |
| 5,471,652 A | 11/1995 | Hulkko | |
| 5,768,691 A | 6/1998 | Matero et al. | |
| 5,789,995 A | 8/1998 | Minasi | |
| 5,881,370 A | 3/1999 | Pottala et al. | |
| 6,018,644 A | 1/2000 | Minarik | |
| 6,553,210 B1 | 4/2003 | Lindemann et al. | |
| 6,717,516 B2 | 4/2004 | Bridgelall | |
| 6,813,320 B1 | 11/2004 | Claxton et al. | |
| 6,882,631 B1 | 4/2005 | Tiedemann | |
| 7,106,816 B2 | 9/2006 | Filipovic | |
| 7,123,883 B2 | 10/2006 | Mages | |
| 2004/0038644 A1 | 2/2004 | Jimenez et al. | |
| 2004/0192222 A1 | 9/2004 | Vaisanen et al. | |
| 2005/0079828 A1 | 4/2005 | Tasaka | |
| 2005/0245202 A1 | 11/2005 | Ranta et al. | |
| 2005/0269403 A1 | 12/2005 | White et al. | |
| 2006/0030265 A1 | 2/2006 | Desai et al. | |
| 2006/0194538 A1 | 8/2006 | Palin et al. | |
| 2006/0205436 A1 | 9/2006 | Liu et al. | |
| 2007/0008132 A1* | 1/2007 | Bellantoni | 340/572.1 |
| 2007/0252764 A1 | 11/2007 | Keski-Opas | |
| 2008/0253345 A1 | 10/2008 | Sanguinetti | |

OTHER PUBLICATIONS

ANADIGICS "AWL6254 Product Brief," Rev 1.2, Sep. 2005.

* cited by examiner

*Primary Examiner* — Edward Urban
*Assistant Examiner* — Hsin-Chun Liao
(74) *Attorney, Agent, or Firm* — Treyz Law Group; G. Victor Treyz; Jason Tsai

(57) ABSTRACT

Handheld electronic devices are provided that contain wireless communications circuitry. The wireless communications circuitry has simultaneous reception functions that allow the handheld devices to simultaneously receive multiple communications signals in a single communications band. The handheld electronic devices may include cellular telephones with music player functionality or other portable devices. The handheld electronic devices may have local wireless communications capabilities for supporting local wireless links such as WiFi and Bluetooth links. Using the simultaneous reception functions of the wireless communications circuitry, users of the handheld electronic devices can simultaneously receive signals such as WiFi and Bluetooth signals.

20 Claims, 11 Drawing Sheets

| SW1 | | | SW2 | | MODE |
|---|---|---|---|---|---|
| A | B | C | D | E | |
| 1 | 0 | 0 | X | X | WLAN TX |
| 0 | 1 | 0 | 1 | 0 | SHARED RX |
| 0 | 0 | 1 | 0 | 1 | BLUETOOTH TX OR DEDICATED RX |

FIG. 6

WIRELESS COMMUNICATIONS CIRCUITRY WITH SIMULTANEOUS RECEIVE CAPABILITIES FOR HANDHELD ELECTRONIC DEVICES

This application is a continuation of patent application Ser. No. 11/636,879, filed Dec. 11, 2006, now U.S. Pat. No. 7,933,561 which is hereby incorporated by referenced herein in its entirety.

BACKGROUND

This invention relates generally to wireless communications circuitry, and more particularly, to wireless communications circuitry with simultaneous receive capabilities for handheld electronic devices.

Handheld electronic devices are becoming increasingly popular. Examples of handheld devices include handheld computers, cellular telephones, media players, and hybrid devices that include the functionality of multiple devices of this type.

Due in part to their mobile nature, handheld electronic devices are often provided with wireless communications capabilities. Handheld electronic devices may use long-range wireless communications to communicate with wireless base stations. For example, cellular telephones may communicate using cellular telephone bands at 850 MHz, 900 MHz, 1800 MHz, and 1900 MHz (e.g., the main Global System for Mobile Communications or GSM cellular telephone bands). Handheld electronic devices may also use short-range wireless communications links. For example, handheld electronic devices may communicate using the WiFi® (IEEE 802.11) band at 2.4 GHz and the Bluetooth® band at 2.4 GHz.

To satisfy consumer demand for small form factor wireless devices, manufacturers are continually striving to reduce the number of components that are used. For example, in some wireless designs a single antenna is shared by two transceivers. Because there is only a single antenna with this type of approach, device size is minimized.

It is not always desirable to share an antenna in a wireless device. In conventional shared antenna arrangements with two transceivers operating on a shared communications frequency, the two transceivers compete with each other for use of the antenna. If, for example, data is being received by one of the transceivers, data cannot be received by the other transceiver. This may lead to dropped data packets and service interruptions.

It would therefore be desirable to be able to provide improved wireless communications circuitry for wireless handheld electronic devices.

SUMMARY

In accordance with an embodiment of the present invention, a handheld electronic device with wireless communications circuitry is provided. The handheld electronic device may have cellular telephone, music player, or handheld computer functionality. The wireless communications circuitry may have multiple transceivers that share an antenna.

With one suitable arrangement, the wireless communications circuitry has first and second transceivers. The first transceiver may be, for example, a wireless local area network (WLAN) transceiver integrated circuit that handles IEEE 802.11 traffic. The second transceiver may be a Bluetooth transceiver. The first transceiver and second transceiver may operate in a common frequency band (e.g., a 2.4 GHz communications frequency band).

The wireless communications circuitry may have a radio-frequency coupler and switching circuitry. When it is desired to simultaneously receive incoming radio-frequency signals from the antenna with both the first transceiver and the second transceiver, the coupler is used to divide the incoming radio-frequency signals into first and second identical power-reduced versions of the incoming radio-frequency signals. These signals are simultaneously provided to the first and second transceivers in parallel.

The first and second versions of the incoming signals that are produced by the coupler may have the same signal power or may have different signal powers. With one suitable arrangement, the coupler is asymmetric, so that the signal that is diverted to the wireless local area network transceiver circuit has a relatively larger power than the signal that is diverted to the Bluetooth transceiver.

When it is desired to transmit WLAN data, the switching circuitry is adjusted appropriately and the WLAN transceiver is made active while the Bluetooth transceiver is made inactive. A power amplifier may be used to amplify outgoing transmitted WLAN data.

When it is desired to use the Bluetooth transceiver without using the WLAN transceiver, the WLAN transceiver is placed in an inactive state. When the WLAN transceiver is inactive, it is not necessary to receive data simultaneously with both the WLAN and Bluetooth circuits. As a result, the switching circuitry can be adjusted to bypass the coupler. With the coupler bypassed, Bluetooth data can be transmitted or Bluetooth data can be received. When receiving Bluetooth data in this way, there is a relatively larger signal strength, because the insertion loss of the coupler is avoided. If desired, an input amplifier may be placed upstream from the coupler to compensate for the coupler's insertion loss.

Further features of the invention, its nature and various advantages will be more apparent from the accompanying drawings and the following detailed description of the preferred embodiments.

BRIEF DESCRIPTION OF THE DRAWINGS

FIG. 6 is a table showing illustrative switch settings that may be used with wireless communications circuitry of the type shown in FIG. 4 in accordance with an embodiment of the present invention.

DETAILED DESCRIPTION

The present invention relates generally to wireless communications and more particularly, to wireless communications circuitry that supports antenna sharing in electronic devices such as portable electronic devices.

Figure 1:
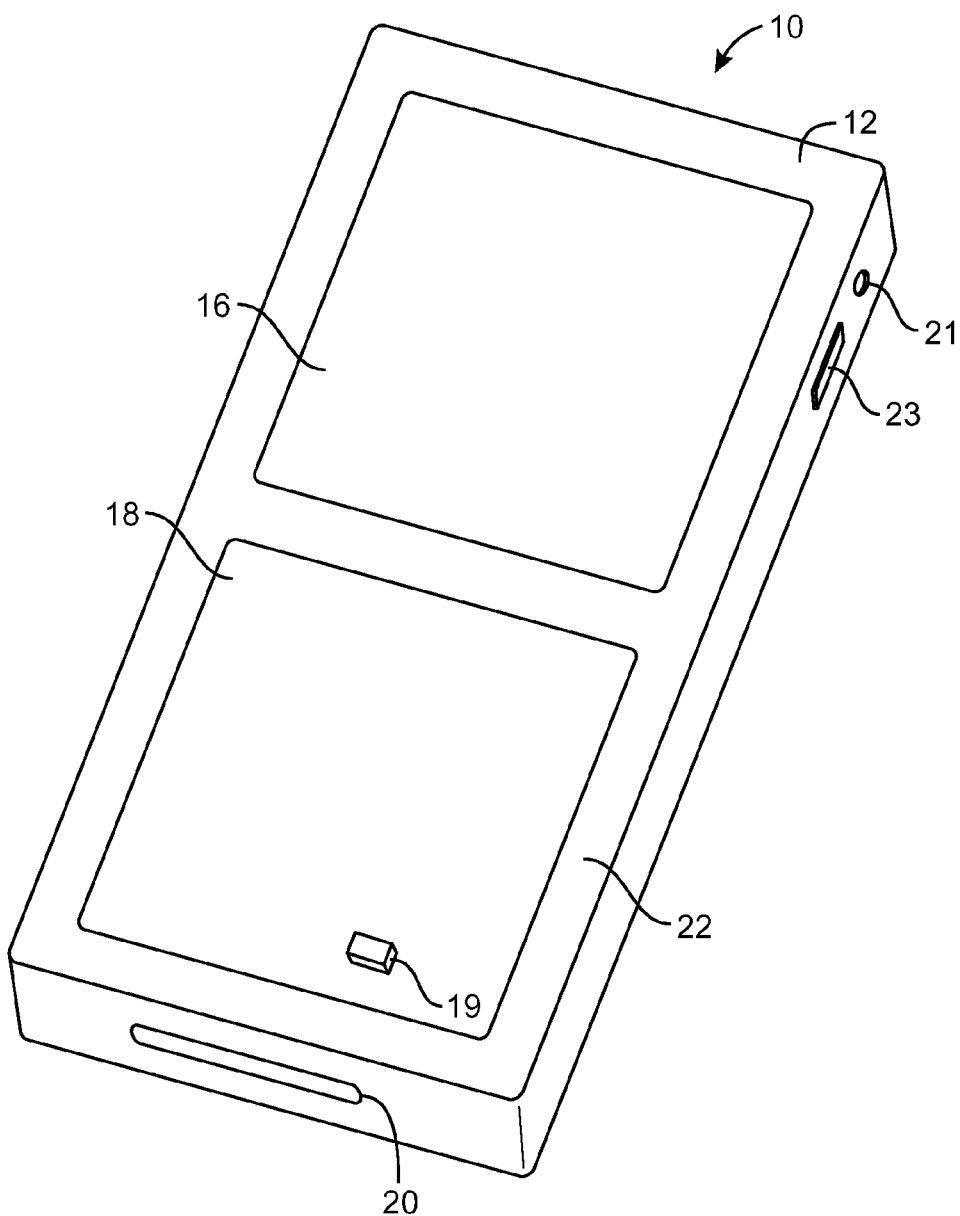
FIG. 1 is a perspective view of an illustrative handheld electronic device with wireless communications circuitry in accordance with an embodiment of the present invention.

An illustrative portable electronic device in accordance with an embodiment of the present invention is shown in FIG. 1. Portable electronic devices such as illustrative portable electronic device 10 may be laptop computers or small portable computers such as those sometimes referred to as ultraportables. Portable electronic devices may also be somewhat smaller devices. Examples of smaller portable electronic devices include wrist-watch devices, pendant devices, headphone and earpiece devices, and other wearable and miniature devices.

With one suitable arrangement, the portable electronic devices are handheld electronic devices. Space is at a premium in handheld electronics devices, so antenna-sharing arrangements for handheld electronic devices can be particularly advantageous. The use of handheld devices is therefore generally described herein as an example, although any suitable electronic device may be used with the wireless communications functions of the present invention, if desired.

Handheld devices may be, for example, cellular telephones, media players with wireless communications capabilities, handheld computers (also sometimes called personal digital assistants), remote controllers, global positioning system (GPS) devices, and handheld gaming devices. The handheld devices of the invention may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples. Device 10 may be any suitable portable or handheld electronic device.

Device 10 includes housing 12 and includes at least one antenna for handling wireless communications. Housing 12, which is sometimes referred to as a case, may be formed of any suitable materials including, plastic, wood, glass, ceramics, metal, or other suitable materials, or a combination of these materials. In some situations, case 12 may be a dielectric or other low-conductivity material, so that the operation of conductive antenna elements that are located in proximity to case 12 is not disrupted. In other situations, case 12 may be formed from metal elements. In scenarios in which case 12 is formed from metal elements, one or more of the metal elements may be used as part of the antenna(s) in device 10.

Any suitable type of antenna may be used to support wireless communications in device 10. Examples of suitable antenna types include antennas with resonating elements that are formed from a patch antenna structure, a planar inverted-F antenna structure, a helical antenna structure, etc. To minimize device volume, at least one of the antennas in device 10 may be shared between two transceiver circuits.

Handheld electronic device 10 may have input-output devices such as a display screen 16, buttons such as button 23, user input control devices 18 such as button 19, and input-output components such as port 20 and input-output jack 21. Display screen 16 may be, for example, a liquid crystal display (LCD), an organic light-emitting diode (OLED) display, a plasma display, or multiple displays that use one or more different display technologies. As shown in the example of FIG. 1, display screens such as display screen 16 can be mounted on front face 22 of handheld electronic device 10. If desired, displays such as display 16 can be mounted on the rear face of handheld electronic device 10, on a side of device 10, on a flip-up portion of device 10 that is attached to a main body portion of device 10 by a hinge (for example), or using any other suitable mounting arrangement.

A user of handheld device 10 may supply input commands using user input interface 18. User input interface 18 may include buttons (e.g., alphanumeric keys, power on-off, power-on, power-off, and other specialized buttons, etc.), a touch pad, pointing stick, or other cursor control device, a touch screen (e.g., a touch screen implemented as part of screen 16), or any other suitable interface for controlling device 10. Although shown schematically as being formed on the top face 22 of handheld electronic device 10 in the example of FIG. 1, user input interface 18 may generally be formed on any suitable portion of handheld electronic device 10. For example, a button such as button 23 (which may be considered to be part of input interface 18) or other user interface control may be formed on the side of handheld electronic device 10. Buttons and other user interface controls can also be located on the top face, rear face, or other portion of device 10. If desired, device 10 can be controlled remotely (e.g., using an infrared remote control, a radio-frequency remote control such as a Bluetooth remote control, etc.).

Handheld device 10 may have ports such as bus connector 20 and jack 21 that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, etc. The functions of some or all of these devices and the internal circuitry of handheld electronic device can be controlled using input interface 18.

Components such as display 16 and user input interface 18 may cover most of the available surface area on the front face 22 of device 10 (as shown in the example of FIG. 1) or may occupy only a small portion of the front face 22. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antenna of handheld electronic device 10 to function properly without being disrupted by the electronic components.

Figure 2:
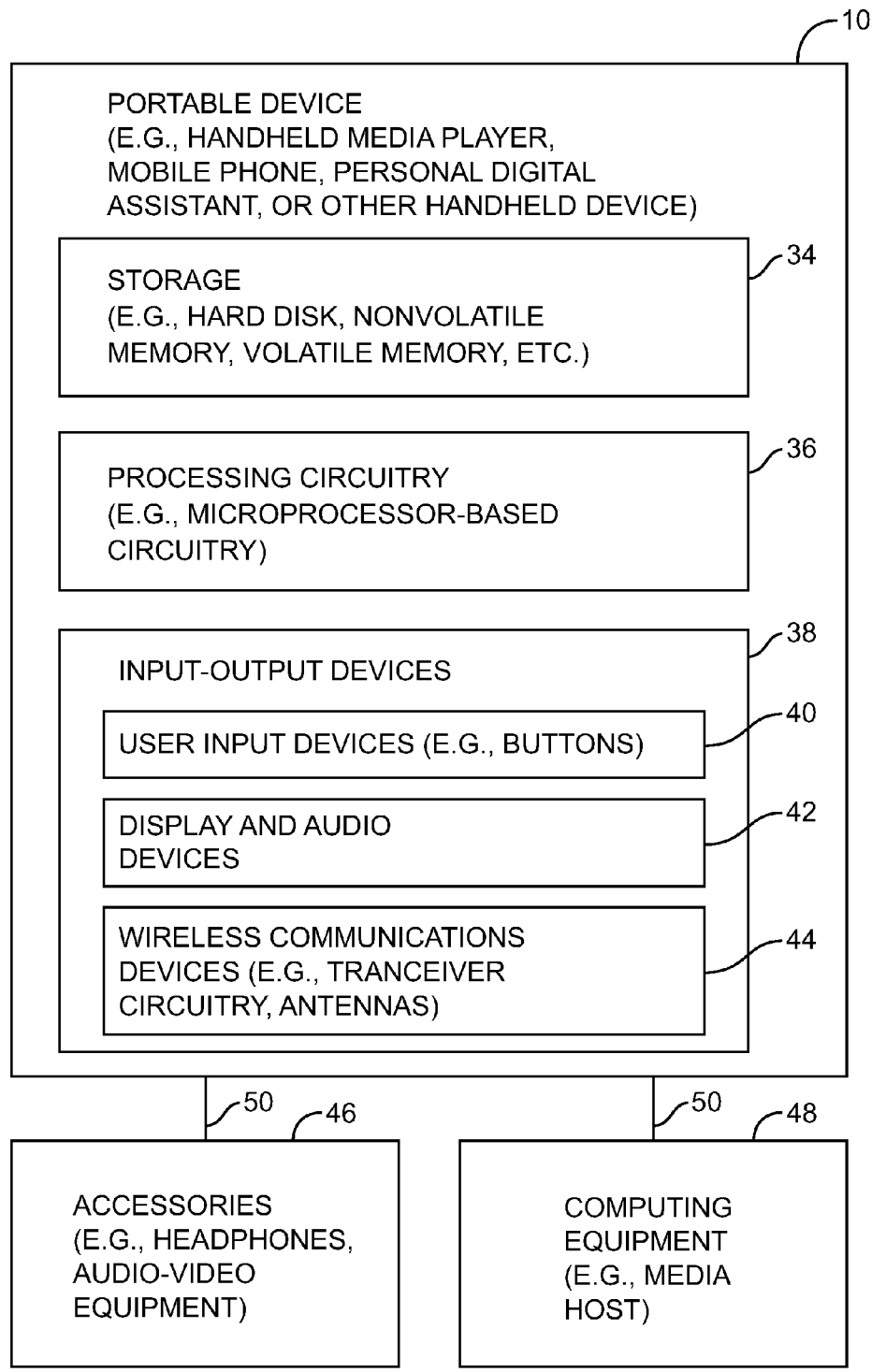
FIG. 2 is a schematic diagram of an illustrative handheld electronic device with wireless communications circuitry in accordance with an embodiment of the present invention.

A schematic diagram of an embodiment of an illustrative handheld electronic device is shown in FIG. 2. Handheld device 10 may be a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VoIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as WiFi®), protocols for other short-range wireless communications links such as the Bluetooth® protocol, etc.)

Input-output devices 38 may be used to allow data to be supplied to device 10 and to allow data to be provided from device 10 to external devices. Display screen 16 and user input interface 18 of FIG. 1 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications).

Device 10 can communicate with external devices such as accessories 46 and computing equipment 48, as shown by paths 50. Paths 50 may include wired and wireless paths. Accessories 46 may include headphones (e.g., a wireless cellular headset or audio headphones) and audio-video equipment (e.g., wireless speakers, a game controller, or other equipment that receives and plays audio and video content). In one illustrative scenario, paths 50 may include a wireless Bluetooth path that is used to support communications between a Bluetooth headset (one of accessories 46) and device 10 and a wireless local area network (WLAN) path (e.g., a WiFi path) that is used to support communications between device 10 and computing equipment 48.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another handheld electronic device 10), or any other suitable computing equipment.

Wireless communications devices 44 may be used to support local and remote wireless links.

Examples of local wireless links include WiFi and Bluetooth links and wireless universal serial bus (USB) links. Because wireless WiFi links are typically used to establish data links with local area networks, links such as WiFi links are sometimes referred to as WLAN links. The local wireless links may operate in any suitable frequency band. For example, WLAN links may operate at 2.4 GHz or 5.6 GHz (as examples), whereas Bluetooth links may operate at 2.4 GHz. The frequencies that are used to support these local links in device 10 may depend on the country in which device 10 is being deployed (e.g., to comply with local regulations), the available hardware of the WLAN or other equipment with which device 10 is connecting, and other factors.

With one suitable arrangement, which is sometimes described herein as an example, device 10 communicates using both the popular 2.4 GHz WiFi bands (802.11(b) and/or 802.11(g)) and the 2.4 GHz Bluetooth band using the same antenna. In this type of configuration, the antenna is designed to operate at a frequency of 2.4 GHz, so the antenna is suitable for use with the 2.4 GHz radio-frequency signals that are used in connection with both the WiFi and Bluetooth communications protocols. Circuitry 44 may include a coupler and other suitable circuitry that allows WiFi and Bluetooth signals to be simultaneously received.

If desired, wireless communications devices 44 may include circuitry for communicating over remote communications links. Typical remote link communications frequency bands include the cellular telephone bands at 850 MHz, 900 MHz, 1800 MHz, and 1900 MHz, the global positioning system (GPS) band at 1575 MHz, and data service bands such as the 3G data communications band at 2170 MHz band (commonly referred to as UMTS or Universal Mobile Telecommunications System). In these illustrative remote communications links, data is transmitted over links 50 that are one or more miles long, whereas in short-range links 50, a wireless signal is typically used to convey data over tens or hundreds of feet.

These are merely illustrative communications bands over which wireless devices 44 may operate. Additional local and remote communications bands are expected to be deployed in the future as new wireless services are made available. Wireless devices 44 may be configured to operate over any suitable band or bands to cover any existing or new services of interest. If desired, multiple antennas and/or a broadband antenna may be provided in wireless devices 44 to allow coverage of more bands. At least one of the antennas (e.g., an antenna used for WiFi and Bluetooth communications at a common communications band frequency of 2.4 GHz) may be shared, as this helps reduce the size of wireless communications circuitry 44 and therefore reduces the size of device 10.

In conventional wireless electronic devices in which an antenna is shared between multiple communications bands, switching circuitry is used to switch between different transceiver modules. While this type of arrangement may be satisfactory in undemanding applications, a shared antenna arrangement that is based solely on switching circuitry can be inadequate in many contemporary situations.

Figure 3:
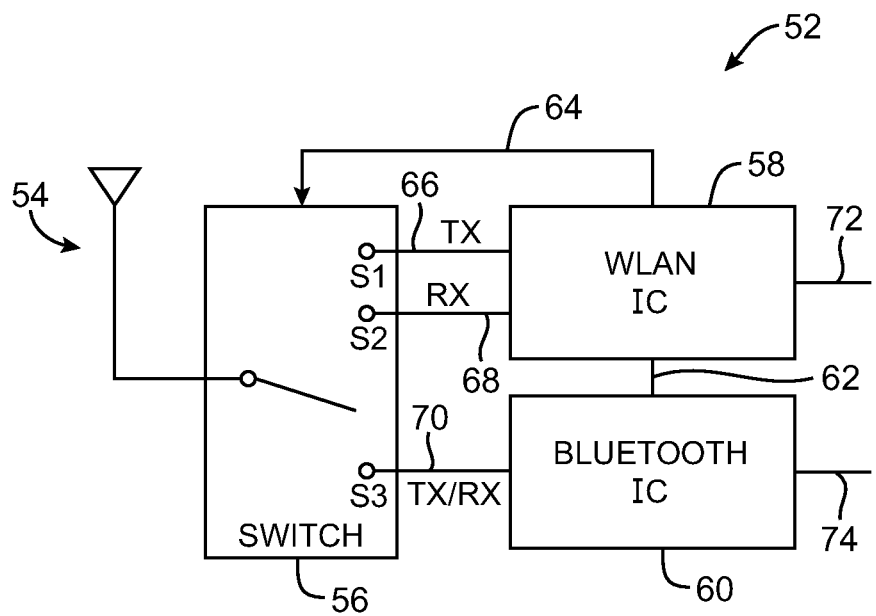
FIG. 3 is a schematic diagram of conventional wireless communications circuitry for a wireless electronic device.

Conventional wireless communications circuitry that is based on a traditional shared-antenna architecture is shown in FIG. 3. Wireless communications circuitry 52 includes antenna 54, which handles radio-frequency signals at a frequency of 2.4 GHz. Switch 56 selectively connects antenna 54 to switch port S1, S2, or S3. Ports S1 and S2 are connected to wireless local area network (WLAN) integrated circuit 58 by respective paths 66 and 68. Port S3 is connected to Bluetooth integrated circuit 60 by path 70. Wireless local-area-network integrated circuit 58 includes a WiFi transceiver and control circuitry. Bluetooth integrated circuit 60 includes a Bluetooth transceiver and control circuitry. WLAN circuit 58 and Bluetooth circuit 60 communicate with each other using handshaking path 62. Paths 72 and 74 are used to provide data and control signals to circuits 58 and 60.

WLAN circuit 58 controls the state of switch 56 using control path 64. When it is desired to transmit WLAN data, switch 56 is connected to position S1, so that data can be transmitted from WLAN integrated circuit 58 to antenna 54 over path 66. Switch 56 is connected to position S2 when it is desired to receive data with WLAN circuit 58. In position S2, signals from antenna 54 are conveyed through switch 56 and over path 68 to WLAN circuit 58. Switch 56 has a third position—S3—that is used when it is desired to transmit or receive Bluetooth signals. In transmit mode, Bluetooth signals are transmitted to antenna 54 via transmit/receive path 70 and switch 56. In receive mode, Bluetooth signals that have been received by antenna 54 are conveyed to Bluetooth integrated circuit 60 by switch 56 and path 70.

The conventional arrangement of FIG. 3 allows antenna 54 to be shared. WiFi traffic is handled by WLAN circuit 58 and Bluetooth traffic is handled by Bluetooth circuit 60. Switch 56 can be switched between WLAN circuit 58 and Bluetooth circuit 60, so that circuits 58 and 60 are able to take turns using antenna 54. Although WLAN circuit 58 and Bluetooth circuit 60 cannot be used at the same time, switch 56 can be switched quickly, so that circuits 58 and 60 are able to use antenna 54 in rapid succession.

Because switch 56 cannot be connected to both WLAN circuit 58 and Bluetooth circuit 60 at the same time, it is necessary to prioritize. Consider, as an example, the situation in which a user of communications circuitry 52 is browsing the internet using WLAN circuit 58, while using Bluetooth connection 60 to control a wireless mouse. In this type of situation, circuits 58 and 60 can decide to favor the Bluetooth connection over the WiFi connection. Whenever it is desired to connect to both the WLAN circuit 58 and the Bluetooth circuit 60 at the same time, the Bluetooth circuit is favored.

With this type of prioritization scheme, the user of circuit 52 will be able to use the wireless mouse without noticeable interruption. However, because the Bluetooth connection is favored over the WLAN connection, WLAN data packets will occasionally be dropped.

For example, consider the situation in which Bluetooth activity arises while requested internet data is being transmitted to WLAN circuit 58. To handle the Bluetooth activity, switch 56 will be connected to switch position S3. Bluetooth data has priority over WLAN data, so the fact that WLAN circuit 58 is in the midst of receiving internet data is immaterial and switch 56 is switched to position S3 to ensure that the Bluetooth activity is handled properly.

Placing switch 56 in position S3 allows Bluetooth circuit 60 to transmit and receive Bluetooth data as needed. However, setting switch 56 to position S3 prevents WLAN circuit 58 from receiving the internet data that is being transmitted. As a result, some internet data packets will be at least temporarily lost.

Data interruptions such as these are unavoidable using the conventional wireless communications circuitry arrangement of FIG. 3, because it is not possible to set switch 56 to a position that allows simultaneous reception of WLAN and Bluetooth data. Although data interruptions such as these may be acceptable in noncritical applications, in some situations the impact of lost data may be severe. For example, a user might desire to use WLAN circuit 58 to support a voice-over-internet-protocol (VOIP) telephone call over the internet, while using a Bluetooth headset. In real-time audio applications such as these, a high quality connection is critical. Using conventional wireless communications circuit 52 of FIG. 3 may cause the VoIP voice signal to break up due to lost data packets.

Figure 4:
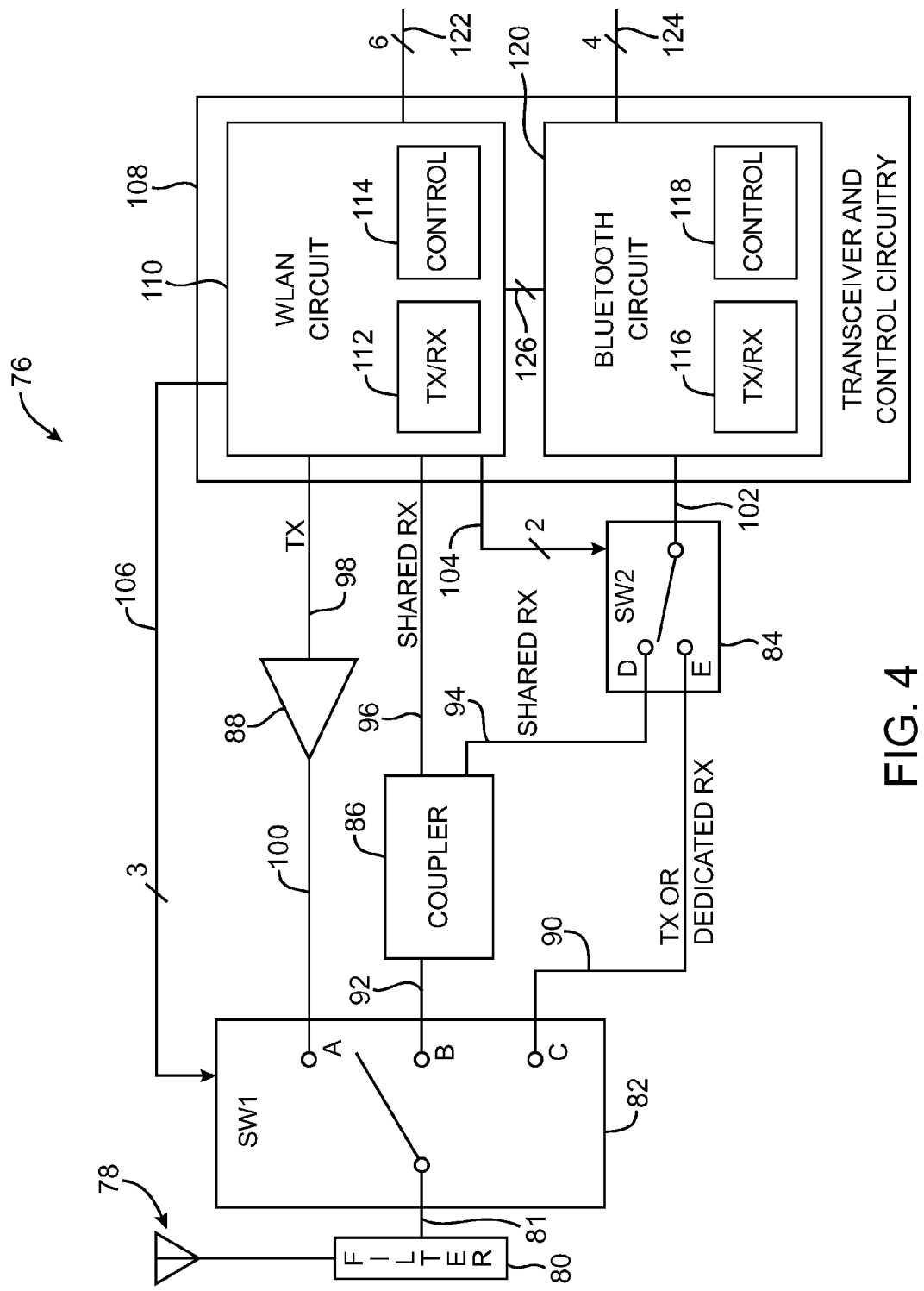
FIG. 4 is a schematic diagram of illustrative wireless communications circuitry for a handheld electronic device in accordance with an embodiment of the present invention.

Wireless communications circuitry 76 in accordance with an illustrative embodiment of the present invention is shown in FIG. 4. As shown in FIG. 4, wireless communications circuitry 76 has an antenna 78. A filter 80 and a direct current (DC) blocking capacitor (not shown) may be used to filter out spurious noise from received signals. Circuitry 76 includes switches 82 and 84 (labeled S1 and S2, respectively). Path 81 connects filter 80 and switch SW1.

Switch SW1 may be set to one of three positions, which are labeled A, B, and C in FIG. 4. Switch SW2 may be set to one of two positions, which are labeled D and E in FIG. 4.

The states of switches SW1 and SW2 are controlled by control signals provided on control lines 106 and 104, respectively. With one suitable arrangement, the control signals are generated by transceiver and control circuitry 108.

Transceiver and control circuitry 108 may contain two or more transceiver circuit such as wireless local-area-network (WLAN) circuit 110 and Bluetooth circuit 120. For clarity, a two-transceiver-circuit embodiment is described herein.

WLAN transceiver circuit 110 may be, for example, an integrated circuit that handles IEEE 802.11(b) or 802.11(g) signals using WiFi transceiver 112 and control circuitry 114. Bluetooth transceiver circuit 120 may be, for example, an integrated circuit that handles Bluetooth signals using Bluetooth transceiver 116 and control circuitry 118. Circuits 110 and 120 may be provided as two separate integrated circuits that are mounted on a common circuit board, using a single integrated circuit, or using more than two integrated circuits. With one suitable arrangement, WLAN circuit 110 is an integrated circuit such as Part No. 88W8686 of Marvell Semiconductor, Inc. of Santa Clara, Calif. and Bluetooth circuit 120 is an integrated circuit such as a BlueCore4 device of CSR, Cambridge, England. Circuits 110 and 120 may communicate with each other over handshaking path 126.

Each transceiver circuit handles a different type of wireless data traffic. In the example of FIG. 4, WiFi traffic is handled using wireless local-area-network (WLAN) circuit 110 and Bluetooth traffic is handled using Bluetooth circuit 120. Each of these circuits interfaces with antenna 78 and with circuitry on the handheld electronic device in which wireless communications circuitry 76 is being used.

Data and control paths 122 and 124 may be used to form communications paths between transceiver and control circuitry 108 and other circuitry on device 10 such as processing circuitry 36 of FIG. 2. Paths 122 and 124 may be used to support any suitable type of data communications. As an example, path 122 may be used to convey control and user data using the so-called secure digital input/output (SDIO) protocol. Paths 124 and 122 may be formed of any suitable number of conductive lines. In the example of FIG. 4, path 122 has been formed from a six-line bus and path 124 has been formed from a four-line bus. This is merely illustrative. Paths such as paths 122 and 124 may be formed from single lines or using larger or smaller busses of multiple lines, if desired.

WLAN circuit 110 may transmit WLAN data wirelessly using data transmission path 98. With the illustrative configuration of FIG. 4, path 98 can be dedicated to conveying transmitted data for circuit 110. Transmitted data on path 98 may be amplified by power amplifier 88. Corresponding amplified versions of the transmitted data signals on path 98 may be provided to switch SW1 over path 100. To transmit data over antenna 78, control signals may be issued on path 106 that direct switch SW1 to connect path 100 to path 81 (switch position A). When switch SW1 has been placed in position A and WLAN data is being transmitted over path 98, wireless communications circuitry 76 of FIG. 4 may be referred to as operating in WLAN TX mode. In this mode of operation, Bluetooth operations are temporarily blocked, so the position of switch SW2 is immaterial.

Figure 5:
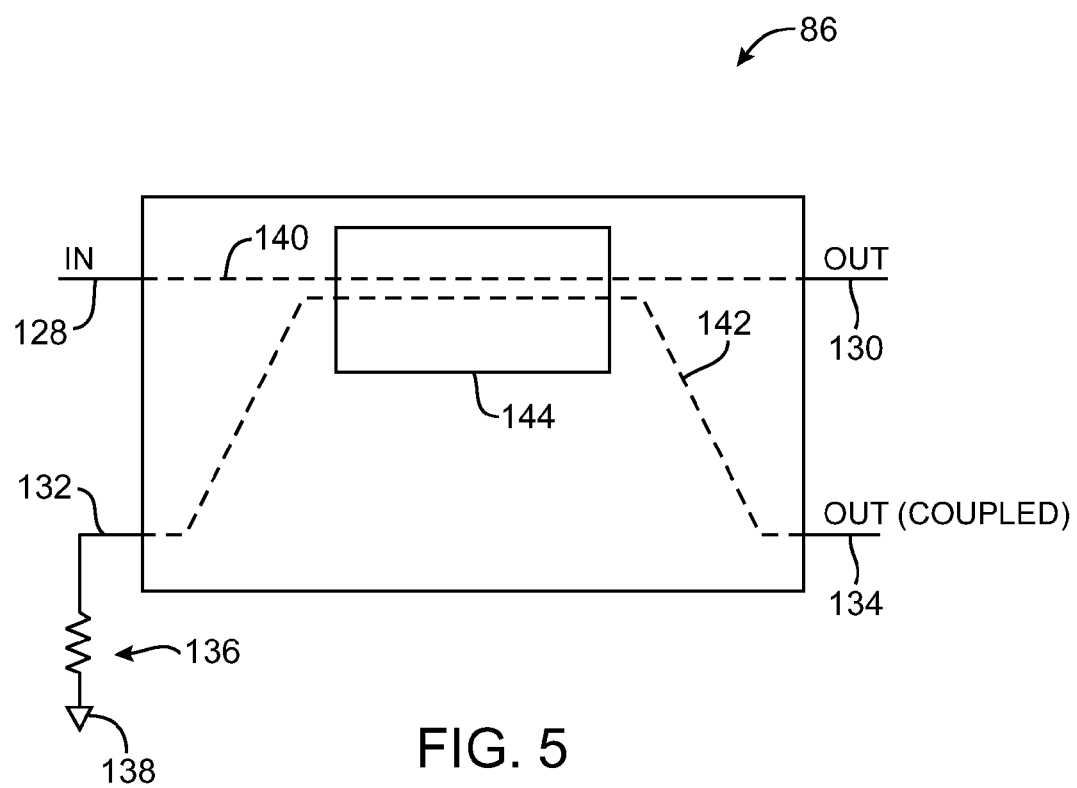
FIG. 5 is a schematic diagram of an illustrative coupler that may be used in wireless communications circuitry for a handheld electronic device in accordance with an embodiment of the present invention.

Circuitry 76 may have a radio-frequency coupler 86. An illustrative coupler 86 is shown in FIG. 5. As shown in FIG. 5, coupler 86 may be implemented as a four-terminal device. Terminal 128 may be used to receive radio-frequency input signals. Termination resistor 136 may be coupled between ground 138 and termination resistor terminal 132. During operation, input signals that are provided to input terminal 128 are divided into two corresponding output signals on outputs 130 and 134. As shown by box 144, coupler 86 typically contains a network of components such as inductors, capacitors, and resistors that cause input signals on path 140 to become coupled onto path 142. As a result, part of the input signal power to coupler 86 is diverted to output terminal 134, while part of the input signal power to coupler 86 passes through to output 130. The splitting ratio of the coupler 86 is typically fixed by the values of the components in network 144. With one suitable arrangement, the output signal on output terminal 130 is −1.8 dB lower in power than the power of the input signal on input terminal 128 and the power of the coupled output signal on output terminal 134 is −6.5 dB lower than the power of the input signal on terminal 128. As this example demonstrates, coupler 86 typically exhibits some internal loss.

In this example, the coupler produces output signals that differ by about 4.7 dB. One output signal, which represents a first power-reduced version of the received radio-frequency input signals to the coupler, has an output power that is 4.7 dB larger than the other output signal, which represents a second power-reduced version of the received radio-frequency input signals to the coupler. The use of a coupler that produces output signals with −1.8 dB and −6.5 dB outputs is, however, merely illustrative. For example, coupler 86 may produce output signals in which the power for output 130 is equal to the power of output 134 or output signals in which the power for output 130 is greater than the power of output 134. An advantage of using arrangements in which the output signal power for output 130 is greater than the output signal power for output 134 is that this may divert a relatively small amount of power away from WLAN circuit 110, thereby helping to preserve proper operation of WLAN circuit 110 under adverse conditions. In general, the power of the signal on output 130 may be any suitable amount greater than the power of the signal on output 134. For example, the power of the signal on output 130 may be 1 dB greater than the power of the signal on output 134 or more. As another example, the power of the signal on output 130 may be at least 2 dB greater than the power of the signal on output 134. As a further example, the power of the signal on output 130 may be at least 3 dB greater than the power of the signal on output 134.

As shown in FIG. 4, coupler 86 may be used to provide wireless communications circuitry 76 with support for a shared receive mode (shared RX mode). In shared RX mode, control signals may be issued on control path 106 that place switch SW1 in position B and control signals may be issued on control path 104 that place switch SW2 in position D. With switches SW1 and SW2 configured in this way, data that is received on antenna 78 and that is provided to coupler 86 via shared input path 92 is split into two identical parts, each having a potentially different signal power. A first part of the received data signal is passed to WLAN circuit 110 on shared received data path 96. A second part of the received data signal is passed to Bluetooth circuit 120 via shared receive data path 94, switch SW2, and path 102. The data of the signals provided to circuits 110 and 120 in the shared receive mode is the same, but the powers of the signals is dictated by the coupler 86 and may be different. For example, the power of the data signal on path 96 may be −1.8 dB with respect to the incoming data signal on path 92, whereas the power of the data signal on path 102 may be −6.5 dB with respect to the incoming data signal on path 92 (as an example).

During use of wireless communications circuitry 76 of FIG. 4 in simultaneous receive mode, WLAN circuit 110 and Bluetooth circuit 120 may be in simultaneous operation, each handling respective portions of the incoming data. For example, when incoming data is an internet protocol (IP) packet destined for WLAN circuit 110, that packet may be received and processed by WLAN circuit 110. When incoming data is Bluetooth data destined for Bluetooth circuit 120, Bluetooth circuit 120 may receive and process the incoming data. Circuits 110 and 120 may be presented with both types of data (WLAN and Bluetooth), but can digitally recognize which type of data is being received and can therefore respond only as appropriate. Although signal strengths are reduced somewhat by the presence of coupler 86, simultaneous data reception is supported, so that demanding applications such as VoIP calls and Bluetooth audio can be simultaneously supported, without concern for lost data packets.

When it is desired to transmit Bluetooth data or when it is desired to receive Bluetooth data on a dedicated path without using coupler 86 (i.e., to benefit from a higher Bluetooth input signal power when simultaneous reception of WLAN data is not required), control signals may be issued on control path 106 that place switch SW1 in position C and control signals may be issued on control path 104 that place switch SW2 into position E. In this configuration, which is sometimes referred to as Bluetooth TX or dedicated RX mode, path 90 may be used for Bluetooth data transmission or for dedicated Bluetooth data reception.

During Bluetooth transmission, transmitted Bluetooth data from Bluetooth circuit 120 is provided to switch SW2 over path 102. Switch SW2, which is set to position E, conveys the outgoing Bluetooth data to switch SW1 over path 90. Switch SW1, which is set to position C, conveys the outgoing Bluetooth data to antenna 78 over path 81 and filter 80.

During dedicated RX mode, received Bluetooth data from antenna 78 and filter 80 is received by switch SW1 over path 81. Switch SW1 is set to position C, so switch SW1 directs the incoming Bluetooth data to switch SW2 over dedicated RX path 90. Because coupler 86 is bypassed in this mode, the signal power on path 90 is larger than it would have been had the signal been split by coupler 86. Because the signal power of the incoming Bluetooth signal is relatively high, it may exhibit a good signal-to-noise ratio. Switch SW2 is set to position E during dedicated RX mode, so the incoming Bluetooth data is routed to Bluetooth circuit 120 via path 102.

FIG. 6 contains a table that illustrates switch settings involved during the operation of wireless communications circuitry 76 of FIG. 4. In table 146, an entry of "0" indicates that a corresponding switch position is not being used, an entry of "1" indicates that a corresponding switch position is being used, and an entry of "X" indicates a don't care bit (the position of the switch is immaterial).

As shown in table 146, during WLAN TX mode, switch SW1 is set to position A, whereas the setting of switch SW2 is immaterial. In WLAN TX mode, WLAN circuit 110 is active and transmits WLAN data using antenna 78.

During shared RX mode, WLAN circuit 110 and Bluetooth circuit 120 are active simultaneously. Switch SW1 is set to position B, whereas switch SW2 is set to position D. In shared RX mode, circuit 110 and circuit 120 receive signals with somewhat reduced powers, but because both circuits are simultaneously active, incoming data is not lost. The type of coupler 86 that is used in the shared RX path influences the signal powers received by WLAN circuit 110 and Bluetooth circuit 120. In general, any suitable ratio of output powers may be produced by coupler 86.

An advantage to using a coupler arrangement in which relatively more of the outgoing signal power is directed to WLAN circuit 110 than to Bluetooth circuit 120 is that this type of arrangement favors the WLAN circuit over the Bluetooth circuit. WLAN links are often formed over larger distances than Bluetooth links and may therefore require more assistance in maintaining good signal quality. Bluetooth links are often formed with equipment that is in the immediate vicinity of device 10 and may therefore require relatively less assistance in maintaining good signal quality. On balance, it is therefore often preferred to use a coupler 86 that produces an output signal on path 96 that has more power than the corresponding output signal on path 94.

Figure 7:
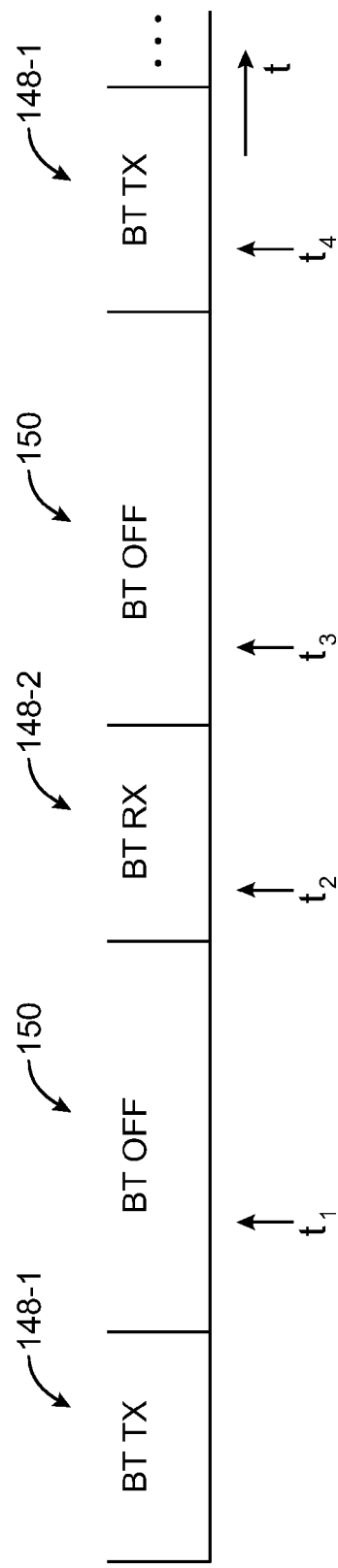
FIG. 7 is a timing diagram that illustrates wireless activity associated with using communications circuitry such as the illustrative wireless communications circuitry of FIG. 4 in accordance with an embodiment of the present invention.

Transceiver circuits such as circuits 110 and 120 in transceiver and control circuitry 108 of FIG. 4 may be used to support any suitable protocols. The use of circuits that support WiFi and Bluetooth links are being described as an example. FIG. 7 illustrates how circuits such as circuits 110 and 120 may handle WLAN traffic and Bluetooth audio traffic. In the example of FIG. 7, time is plotted on the horizontal axis. According to Bluetooth audio protocol specifications, Bluetooth circuit 120 will be active in Bluetooth time slots 148-1 and 148-2. During Bluetooth operations, Bluetooth circuit 120 alternates between transmitting data and receiving data. The Bluetooth time slots are labeled "BT TX" (148-1) and "BT RX" (148-2) to indicate whether Bluetooth circuit 120 is transmitting or receiving Bluetooth data. During time slots 150, Bluetooth circuit 120 is inactive, as indicated by the labels "BT OFF" in time slots 150.

With conventional wireless communications circuitry of the type shown in FIG. 3, WLAN operations are blocked completely during the active Bluetooth time slots. As a result, with conventional circuitry 52 of FIG. 3, WLAN data that is sent to circuitry 52 at a time such as time $t_2$ or at a time such as time $t_4$ in FIG. 7 will be lost. Conventional circuitry 52 only allows WLAN data to be successfully transmitted or received at times such as time $t_1$ or time $t_3$, when Bluetooth integrated circuit 60 of FIG. 3 is inactive. Particularly in environments in which a premium is placed on low-latency and negligible packet loss, such as when supporting VOIP telephone calls, conventional arrangements of the type shown in FIG. 3 can be disadvantageous.

Wireless communications circuitry 76 of the type shown in FIG. 4 can be used to support a simultaneous RX mode, which allows WLAN circuit 110 and Bluetooth circuit 120 to receive incoming data at the same time. Because both WLAN circuit 110 and Bluetooth circuit 120 can be active and receiving data at the same time, WLAN data can be received at times such as time $t_2$ in FIG. 7 as well as times such as times $t_1$ and $t_3$. Unlike conventional circuitry that blocks WLAN data during BT RX time slots, wireless communications circuitry 76 can be used to receive WLAN data during BT RX time slots. As a result, the amount of WLAN data that is blocked due to simultaneous Bluetooth activity is minimized. In applications such as VoIP telephone calls, where it is desirable to minimize data packet loss, the quality of the VoIP service that device 10 can deliver may be improved significantly when using the simultaneous receive functions of wireless communications circuitry 76.

Figure 8:
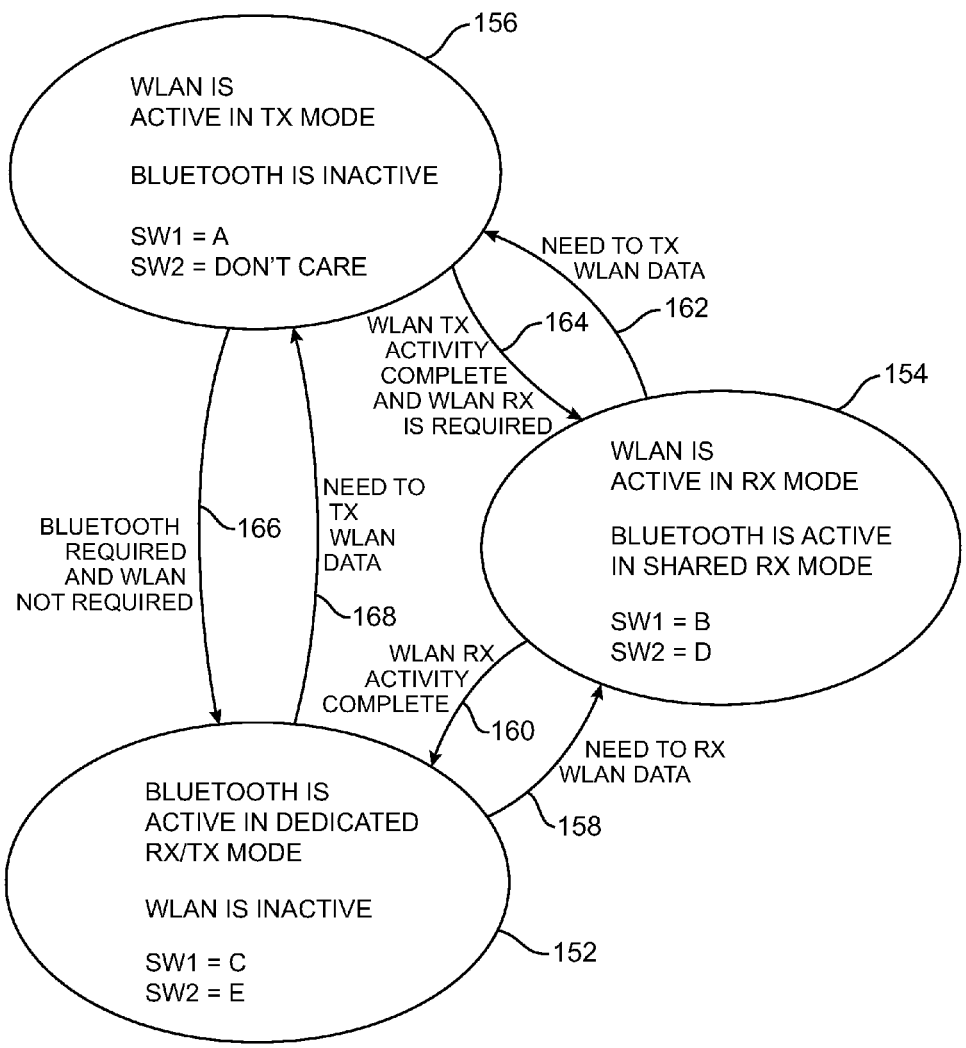
FIG. 8 is an illustrative state diagram showing how wireless communications circuitry in a handheld electronic device such as the wireless communications circuitry of FIG. 4 may be used to handle wireless data traffic associated with two different transceivers in accordance with an embodiment of the present invention.

A state diagram illustrating modes in which device 10 and wireless communications circuitry 76 may operate is shown in FIG. 8. The embodiment of wireless communications circuitry 76 that is described in connection with the state diagram of FIG. 8 has a first transceiver that handles wireless local area network (WLAN) communications, also sometimes referred to as WiFi communications or IEEE 802.11 communications and has a second transceiver is used to handle Bluetooth communications. This type of arrangement is merely illustrative. In general, wireless communications circuitry 76 and transceiver and control circuitry 108 can be used to support any suitable communications protocols. The description of WLAN and Bluetooth communications protocols is an example.

As shown in FIG. 8, wireless communications circuitry 76 and device 10 may operate in at least three states, state 152, state 154, and state 156.

In state 152, Bluetooth circuit 120 is active in Bluetooth TX or dedicated RX mode, whereas WLAN circuit 110 is inactive. State 152 corresponds to the third row in table 146 of FIG. 6. In state 152, switch SW1 is in position C and switch SW2 is in position E. When Bluetooth circuit 120 is in transmit mode, a radio-frequency transmitter circuit in transceiver 116 is used to generate outgoing Bluetooth data (e.g., data that has been received via path 124). The transmitted Bluetooth data is conveyed to antenna 78 via path 102, switch SW2, path 90, switch SW1, path 81, filter 80, and antenna 78. An example of a time during which Bluetooth data is being transmitted by circuitry 76 is time $t_4$ in BT TX slot 148-1 of FIG. 7. When Bluetooth circuit 120 is in dedicated RX mode, Bluetooth that is received from antenna 78 is conveyed to a receiver in transceiver 116 via antenna 78, filter 80, path 81, switch SW1, path 90, switch SW2, and path 102. Bluetooth data may be received over the dedicated RX path 90 in this way at any suitable time (see, e.g., time $t_2$ in BT RX time slot 148-2 of FIG. 7).

Circuits such as circuit 108 and processing circuitry 36 may have one or more internal clocks. For example, Bluetooth circuit 120 and WLAN circuit 110 may have each have an internal clock or may access a shared system clock. Using timing information from the clock circuitry and protocols implemented in processing circuitry 36 and circuits 110 and 120, circuits 110 and 120 and processing circuitry 36 can make decisions on when to switch between different modes of operation in wireless communications circuitry 76. Consider, as an example, a situation in which WLAN circuit 110 is in a sleep state. At a particular time (or when a particular set of conditions are satisfied), the WLAN circuit 110 wakes up to check for incoming data (as an example). As indicated by line 158, when the WLAN circuit wakes up to receive WLAN data, wireless communications circuitry 76 transitions from state 152 to state 154.

During transition 158, WLAN circuit 110 issues control signals for switch SW1 on path 106 that set switch SW1 to position B. WLAN circuit 110 also issues control signals on path 104 that set switch SW2 to position D. Making these adjustments causes signals from antenna 78 to be diverted through coupler 86. Part of the incoming signal power is directed to WLAN circuit 110 over shared RX path 96 and part of the incoming signal power is directed to Bluetooth circuit 120 over shared RX path 94 and path 102. Because of the presence of coupler 86, the incoming signal power is reduced somewhat. However, both circuits 110 and 120 are able to receive the incoming signal at the same time. Because both WLAN circuit 110 and Bluetooth circuit 120 are able to simultaneously receive incoming radio-frequency signals, state 154 is sometimes referred to as shared RX mode. State 154 corresponds to the second row of table 146 in FIG. 6. In the diagram of FIG. 7, time $t_2$ in BT RX slot 148-2 may be associated with state 154.

When wireless communications circuitry 76 and/or processor 36 determines that WLAN circuit 110 has completed its necessary WLAN receiving activities (i.e., when no data needs to be received or when receive operations are finished), wireless communications circuitry 76 can transition back to state 152, as indicated by arrow 160. During transition 160, WLAN circuit 110 issues control signals for switch SW1 on path 106 that set switch SW1 to position C and issues control signals on path 104 that set switch SW2 to position E. In state 152, WLAN circuit 110 is inactive and Bluetooth circuit 120 is either transmitting Bluetooth signals or is receiving signals over dedicated RX path 90. By switching the receive path from shared RX path 94 back to dedicated RX path 90, coupler 86 is bypassed and Bluetooth circuit 120 is assured of receiving high-quality incoming data.

During state 154, WLAN circuit 110 is active and Bluetooth circuit 120 is active in shared RX mode. In state 154, when wireless communications circuitry 76 determines that WLAN circuit 110 needs to transmit data, wireless communications circuitry 76 transitions to state 156, as indicated by transition line 162. As an example, WLAN circuit 110 may need to transmit an acknowledgement packet. To make this transmission, the WLAN circuit 110 may wait until Bluetooth receive operations have been completed (e.g., when a BT RX slot 148-2 has just finished). At this point, Bluetooth circuit 120 becomes inactive.

As shown in FIG. 8, in state 156, WLAN circuit 110 is active and is transmitting data. Bluetooth circuit 120 is inactive. During transition 162, control signals are issued on path 106 that set switch SW1 to position A. When switch SW1 is in position A, transmitted WLAN data from WLAN circuit 110 is passed to power amplifier 88 via TX path 98. Amplifier 88 amplifies the transmitted signal and provides the amplified version of the transmitted signal to switch SW1 over path 100. The signal passes through switch SW1, is filtered by filter 80, and is transmitted wirelessly over antenna 78.

The position of switch SW2 is generally not critical in state 156, because no signals can be received or transmitted through switch SW2 so long as switch SW1 is in position A. Nevertheless, it may be desirable to set switch SW2 to position E as a default. In this position, switch SW2 defines a low-loss path for transmitting and receiving data from Bluetooth circuit 120. By placing switch SW2 in position E in state 156, switch SW2 will be ready to use in the event that wireless communications circuitry 76 transitions back to state 152.

When in state 156, wireless communications circuitry 76 can transition back to state 154 once WLAN transmission activity is complete, as indicated by line 164. Wireless communications circuitry 76 makes transition 164 when WLAN circuit 120 is needed to receive data. In state 154, WLAN circuit 120 may be used to receive data while Bluetooth circuit 120 again becomes active in shared RX mode. During transition 164, control signals are issued on path 106 that place switch SW1 in state B and control signals are issued on path 104 that place switch SW2 in position D.

When in state 156, wireless communications circuitry 76 can also transition to state 152, as indicated by transition line 166. Wireless communications circuitry 76 makes transition 166 when Bluetooth operations are required, but WLAN operations are not required. For example, a clock in WLAN circuit 110 may be used to determine that BT OFF slot 150 has expired. When a BT OFF slot expires, Bluetooth operations may be required. If WLAN circuit 110 is not needed for receiving data, wireless communications circuitry 76 can transition to state 152, as indicated by line 166.

During transition 166, control signals are issued for switch SW1 on path 106 that set switch SW1 to position C. Control signals are issued on path 104 that set switch SW2 to position E. In state 152, WLAN circuit 110 is inactive and Bluetooth circuit 120 is either transmitting Bluetooth signals or is receiving signals over dedicated RX path 90. By switching the receive path from shared RX path 94 back to dedicated RX path 90 during transition 166, coupler 86 is bypassed and Bluetooth circuit 120 is assured of receiving high-quality incoming data.

While in state 152, it may become necessary to use WLAN circuit 110 to transmit data. For example, processing circuitry 36 may have data that is to be transferred over a wireless local area network with which device 10 is in communication. To transmit the data using WLAN circuit 110, wireless communications circuitry 166 transitions to state 156, as indicated by line 168. During transition 168, control signals are issued that place switch SW1 in position A. This connects WLAN transmit path 100 to antenna 78 and allows WLAN circuit 110 to transmit the desired data. The state of switch SW2 in state 156 is immaterial to the operation of WLAN circuit 110, but, if desired, may be left in position E to facilitate a transition back to state 152 after the WLAN data has been transmitted.

Figure 9:
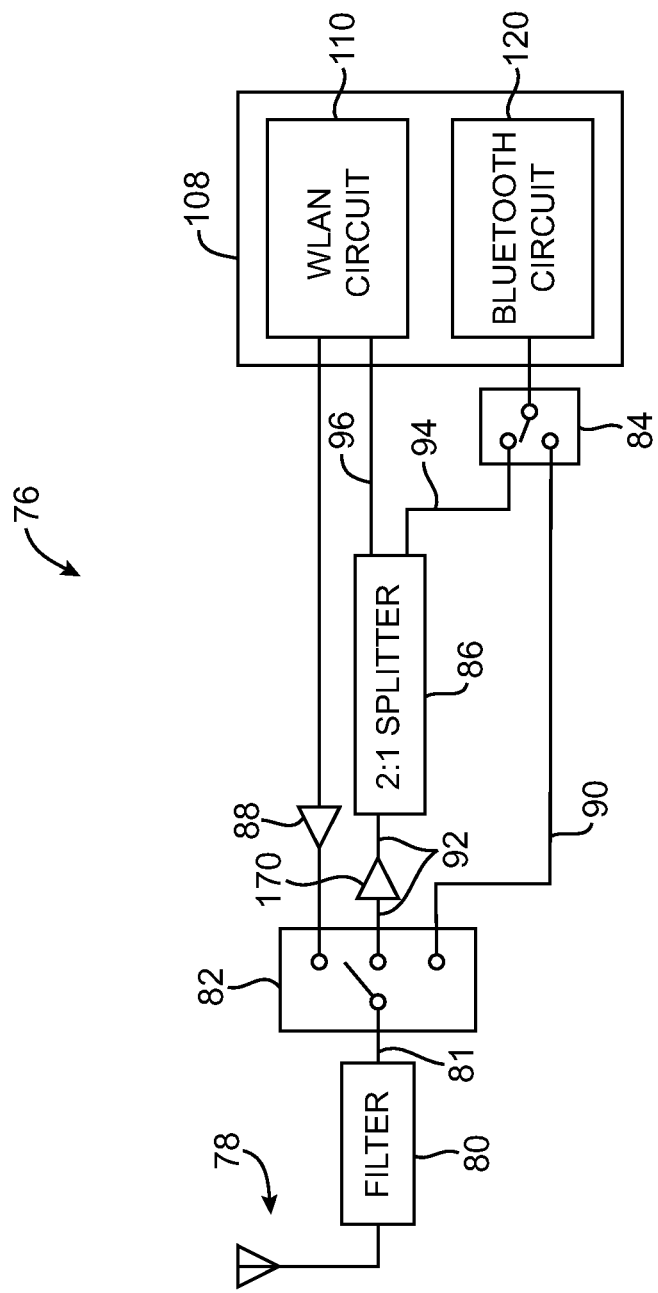
FIG. 9 is a schematic diagram of illustrative wireless communications circuitry using a 2:1 splitter and low noise amplifier in an input data path in accordance with an embodiment of the present invention.

FIG. 9 shows an embodiment of wireless communications circuitry 76 in which coupler 86 has been implemented using a coupler that has an even splitting ratio. With this type of arrangement, incoming signals on path 92 are divided into two parts for respective paths 94 and 96. Because the power of the divided input signals on paths 94 and 96 is equal, couplers of this type are sometimes referred to as 2:1 splitters. Although shown as a 2:1 splitter in FIG. 9, coupler 86 may produce any suitable ratio of output powers on its outputs, if desired.

In the embodiment of FIG. 9, wireless communications circuitry 76 has an input amplifier interposed in path 92. Input amplifier 170 may, for example, be a radio-frequency amplifier of the type that is sometimes referred to as a low noise amplifier (LNA). The gain of input amplifier 170 helps to offset the power loss that arises from the use of coupler 86. With one suitable arrangement, the gain of input amplifier 170 may be set to compensate almost exactly for the loss of coupler 86. With this type of arrangement, if the loss imposed by coupler 86 is −4 dB to −4.5 dB on each output path (as an example), the gain of input amplifier 170 may be set to +8-9 dB, so that amplifier 170 overcomes the insertion loss of coupler 86. This is merely an illustrative configuration for amplifier 170 and coupler 86. In general, coupler 86 may exhibit any suitable associated insertion loss and amplifier 170 may have any suitable gain level to mitigate the loss imposed by coupler 86. If desired, one or more input amplifiers such as amplifier 170 may be used in wireless communications circuitry 76 and such amplifiers may be placed in other suitable input paths (e.g., path 96).

Figure 10:
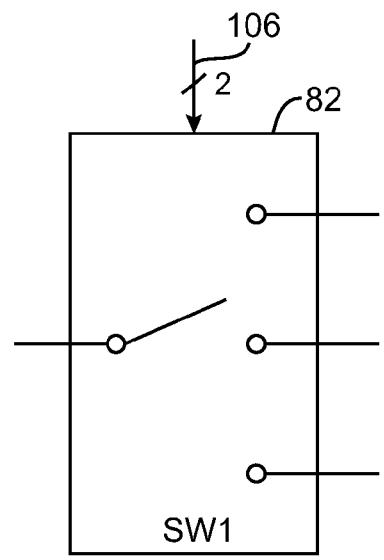
FIG. 10 is a schematic diagram of an illustrative three-way switch that may be used in wireless communications circuitry of the type shown in FIG. 4 in accordance with an embodiment of the present invention.
Figure 11:
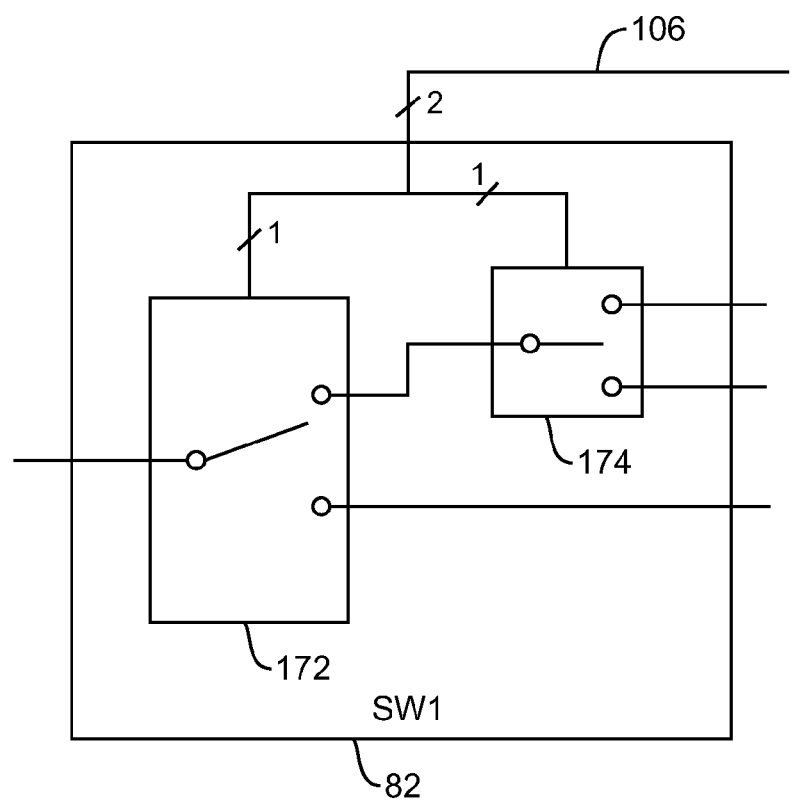
FIG. 11 is a schematic diagram of an illustrative three-way switch that has been implemented using two two-way switches and that may be used in wireless communications circuitry of the type shown in FIG. 4 in accordance with an embodiment of the present invention.

Switches such as three-way switch SW1 and two-way switch SW2 may be implemented using any suitable switching hardware. With one suitable arrangement, switch SW1 may be implemented using a single pole three throw (SP3T) switch that is controlled by control signals provided on a two-line control bus as shown in FIG. 10. If desired, three-way switch SW1 may be implemented using two two-way switches 172 and 174, as shown in FIG. 11.

Figure 12:
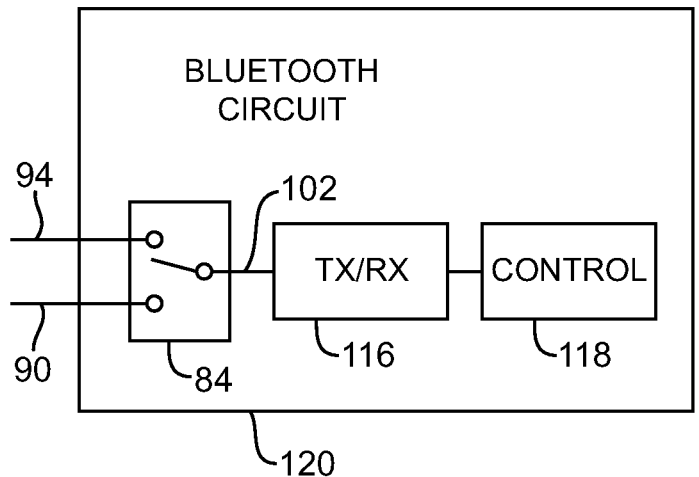
FIG. 12 is a schematic diagram of an illustrative Bluetooth transceiver and control circuit having an integrated two-way switch that may be used in wireless communications circuitry for a handheld electronic device in accordance with an embodiment of the present invention.

FIG. 12 shows how switches may be incorporated into transceiver and control circuitry 108. In the example of FIG. 12, Bluetooth circuit 120 includes switching functionality in the form of two-way switch 84. Transceiver 116 and control circuitry 118 may be used to send and receive data. Signals may be conveyed between switch 84 and transceiver 116 over path 102.

Figure 13:
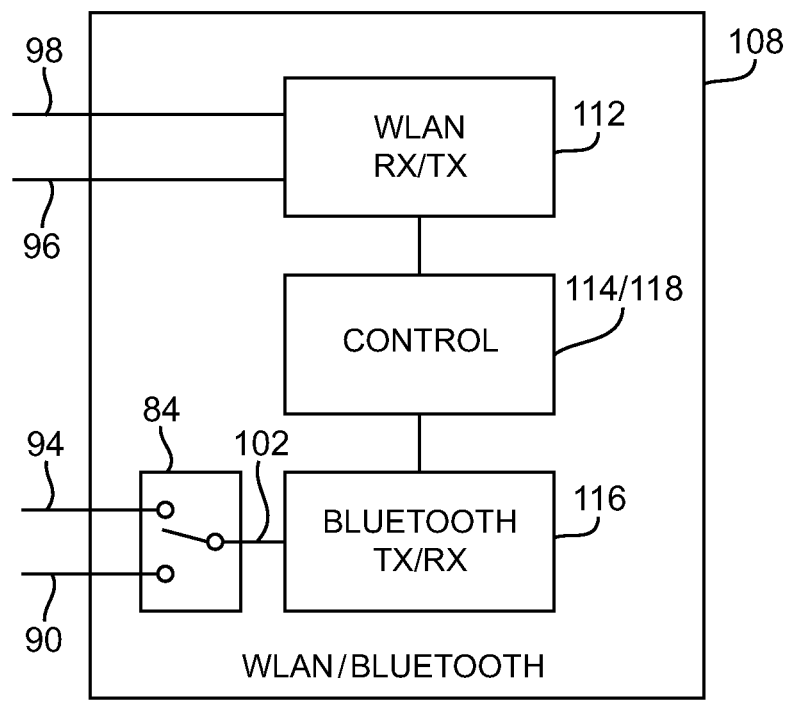
FIG. 13 is a schematic diagram of an illustrative wireless local area network (WLAN) and Bluetooth transceiver and control circuit that may be used in wireless communications circuitry for a handheld electronic device in accordance with an embodiment of the present invention.

Circuits such as WLAN circuit 110 and Bluetooth circuit 120 may be provided using one or more integrated circuits. With one suitable arrangement, WLAN circuit 110 is provided using one or more integrated circuits and Bluetooth circuit 120 is provided using one or more integrated circuits. With another suitable arrangement, which is illustrated in FIG. 13, the functions of WLAN circuit 110 and Bluetooth circuit 120 are integrated into a common integrated circuit (WLAN/Bluetooth transceiver and control circuit 108). When two transceivers are integrated in this fashion, a single control block may be used for processing and control. In the example of FIG. 13, WLAN/Bluetooth integrated circuit 108 includes WLAN transceiver 112 and Bluetooth transceiver 116, which are controlled by a common control block 114/118. This type of arrangement may be used with a separate two-way switch, such as switch SW2 of FIG. 4, or may be used with integrated two-way switch such as switch 84 of FIG. 13. If desired, the functionality of other components such as switch 82, coupler 86, and amplifiers 88 and 170 may be integrated with circuitry of the type shown in FIG. 13 in the form of one or more integrated circuits.

The foregoing is merely illustrative of the principles of this invention and various modifications can be made by those skilled in the art without departing from the scope and spirit of the invention.

What is claimed is:

1. Wireless communications circuitry comprising:
   transceiver circuitry comprising a first transceiver circuit and a second transceiver circuit, wherein the first and second transceiver circuits communicate using different communications protocols and a common radio-frequency frequency band;
   an antenna that handles radio-frequency signals in the common radio-frequency frequency band;
   a radio-frequency coupler comprising an input and first and second outputs, wherein when the wireless communications circuitry is operated in a first mode, the input receives radio-frequency signals from the antenna and simultaneously provides corresponding first and second reduced-power versions of the received radio-frequency signals to the first and second outputs, respectively, wherein the first reduced-power version of the received radio-frequency signals is received by the first transceiver circuit, and wherein the second reduced-power version of the received radio-frequency signals is received by the second transceiver circuit;
   a first switch that is connected to the antenna and that has at least first, second, and third positions, wherein the first switch is coupled to at least one of the first and second transceiver circuits when placed in each of the first, second, and third positions; and
   a second switch that is coupled between the first switch and a transmit-receive port of the second transceiver circuit, wherein when the wireless communications circuitry is operated in a second mode, the first transceiver circuit is active and transmits radio-frequency signals through the first switch and the antenna without passing through the radio-frequency coupler, and wherein when the wireless communications circuitry is operated in a third mode, the second transceiver circuit is active and generates, at the transmit-receive port, radio-frequency signals that are transmitted through the second switch.

2. The wireless communications circuitry defined in claim 1, wherein:
   when the wireless communications circuitry is operated in the first mode, the first switch is placed in its second position to route radio-frequency signals from the antenna to the input of the radio-frequency coupler and the second switch is placed in its first position so that the radio-frequency coupler is coupled to the second transceiver circuit;
   when the wireless communications circuitry is operated in the second mode, the first switch is placed in its first position to route radio-frequency signals that have been transmitted from the first transceiver circuit to the antenna; and
   when the wireless communications circuitry is operated in the third mode, the first switch is placed in its third position and the second switch is placed in its second position so that the antenna is coupled to the transmit-receive port of the second transceiver circuit.

3. The wireless communications circuitry defined in claim 1, wherein:
   when the wireless communications circuitry is operated in the first mode, the first switch is placed in its second position to route radio-frequency signals from the antenna to the input of the radio-frequency coupler and the second switch is placed in its first position to route signals from the second output of the radio-frequency coupler to the second transceiver circuit;
   when the wireless communications circuitry is operated in the second mode, the first switch is placed in its first position to route radio-frequency signals that have been transmitted from the first transceiver circuit to the antenna; and
   when the wireless communications circuitry is operated in the third mode, the first switch is placed in its third position and the second switch is placed in its second position so that the antenna is coupled to the transmit-receive port of the second transceiver circuit through the first and second switches.

4. The wireless communications circuitry defined in claim 1, wherein:
   when the wireless communications circuitry is operated in the first mode, the first switch is placed in its second position to route radio-frequency signals from the antenna to the input of the radio-frequency coupler and the second switch is placed in its first position to route signals from the second output of the radio-frequency coupler to the second transceiver circuit;

when the wireless communications circuitry is operated in the second mode, the first switch is placed in its first position to route radio-frequency signals that have been transmitted from the first transceiver circuit to the antenna; and when the wireless communications circuitry is operated in the third mode, the first switch is placed in its third position and the second switch is placed in its second position so that radio-frequency signals are conveyed between the transmit-receive port of the second transceiver circuit and the antenna through the first and second switches and without passing through the radio-frequency coupler.

5. The wireless communications circuitry defined in claim 1, wherein:

when the wireless communications circuitry is operated in the first mode, the first switch is placed in its second position to route radio-frequency signals from the antenna to the input of the radio-frequency coupler and the second switch is placed in its first position to route signals from the second output of the radio-frequency coupler to the second transceiver;

when the wireless communications circuitry is operated in the second mode, the first switch is placed in its first position to route radio-frequency signals that have been transmitted from the first transceiver to the antenna through the power amplifier; and when the wireless communications circuitry is operated in the third mode, the first switch is placed in its third position and the second switch is placed in its second position so that the antenna is coupled to the transmit-receive port of the second transceiver circuit through the first and second switches.

6. The wireless communications circuitry defined in claim 1, further comprising:

storage and processing circuitry, wherein the storage and processing circuitry is coupled to the transceiver circuitry, and wherein the storage and processing circuitry is configured to generate data for wireless transmission and is configured to process wirelessly received data.

7. The wireless communications circuitry defined in claim 1, wherein the first transceiver circuit comprises a wireless local area network transceiver circuit.

8. The wireless communications circuitry defined in claim 1, wherein the second transceiver circuit comprises a Bluetooth transceiver circuit.

9. The wireless communications circuitry defined in claim 1, wherein the first transceiver circuit comprises a wireless local area network transceiver circuit and wherein the second transceiver circuit comprises a Bluetooth transceiver circuit.

10. Wireless communications circuitry comprising:
a first wireless transceiver circuit that transmits and receives according to a first communications protocol in a given radio-frequency communications frequency band;
a second wireless transceiver circuit that transmits and receives according to a second communications protocol in the given radio-frequency communications frequency band, wherein the first and second communications protocols are different;
an antenna;
a radio-frequency coupler;
switching circuitry that is responsive to control signals and that routes radio-frequency signals to and from the antenna, wherein the switching circuitry includes a first switch that has at least first and second positions and that is coupled between the radio-frequency coupler and a transmit-receive port of the second wireless transceiver circuit, wherein the wireless communications circuitry is operative in at least first, second, and third modes of operation, wherein:

in the first mode of operation, the first wireless transceiver circuit is active and transmits radio-frequency signals through the switching circuitry and the antenna without passing through the radio-frequency coupler;

in the second mode of operation, the first and second wireless transceiver circuit are both active and receive respective first and second versions of identical radio-frequency signals through the radio-frequency coupler and the first switch is placed in its first position to route radio-frequency signals from the radio-frequency coupler to the second wireless transceiver circuit; and in the third mode of operation, the first wireless transceiver circuit is inactive and the second wireless transceiver is active and transmits and receives radio-frequency signals through the first switch and the antenna without passing through the radio-frequency coupler and the first switch is placed in its second position so that the antenna is coupled to the transmit-receive port of the second wireless transceiver through the switching circuitry.

11. The wireless communications circuitry defined in claim 10 wherein the switching circuitry further comprises a second switch having at least a first position in which the second switch routes the radio-frequency signals transmitted from the first transceiver to the antenna in the first mode of operation and a second position in which the second switch routes the radio-frequency signals from the antenna to the radio-frequency coupler in the second mode of operation.

12. The wireless communications circuitry defined in claim 10 wherein:

the switching circuitry further comprises a second switch having at least a first position in which the second switch routes the radio-frequency signals transmitted from the first transceiver to the antenna in the first mode of operation and a second position in which the second switch routes the radio-frequency signals from the antenna to the radio-frequency coupler in the second mode of operation;

the radio-frequency coupler has first and second outputs; and during the second mode of operation, the first wireless transceiver circuit receives the first version of the radio-frequency signals from the first output of the radio-frequency coupler and the second wireless transceiver circuit receives the second version of the radio-frequency signals from the second output of the radio-frequency coupler through the first switch.

13. The wireless communications circuitry defined in claim 10 wherein:

the switching circuitry further comprises a second switch having at least a first position in which the second switch routes the radio-frequency signals transmitted from the first transceiver to the antenna in the first mode of operation and a second position in which the second switch routes the radio-frequency signals from the antenna to the radio-frequency coupler in the second mode of operation;

the radio-frequency coupler has first and second outputs;

during the second mode of operation, the first wireless transceiver circuit receives the first version of the radio-frequency signals from the first output of the radio-frequency coupler and the second wireless transceiver circuit receives the second version of the radio-frequency signals from the second output of the radio-frequency coupler;

the first version and second version of the radio-frequency signals have respective first and second signal powers; and the first signal power is greater than the second signal power.

14. The wireless communications circuitry defined in claim 10 wherein:

the switching circuitry further comprises a second switch having at least a first position in which the second switch routes the radio-frequency signals transmitted from the first transceiver to the antenna in the first mode of operation and a second position in which the second switch routes the radio-frequency signals from the antenna to the radio-frequency coupler in the second mode of operation;

the radio-frequency coupler has first and second outputs;

during the second mode of operation, the first wireless transceiver circuit receives the first version of the radio-frequency signals from the first output of the radio-frequency coupler and the second wireless transceiver circuit receives the second version of the radio-frequency signals from the second output of the radio-frequency coupler;

the first version and second version of the radio-frequency signals have respective first and second signal powers; and the first signal power is greater than the second signal power by at least 3 dB.

15. The wireless communications circuitry defined in claim 10, wherein the given radio-frequency communications frequency band comprises a 2.4 GHz radio-frequency communications band.

16. A method for using wireless communications circuitry in a handheld wireless device comprising:

storing data in storage on the portable wireless device;

with processing circuitry that is coupled to the storage, generating data for wireless transmission and processing wirelessly received data;

with an antenna and a first transceiver circuit in the wireless communications circuitry, communicating wirelessly in a communications frequency band according to a first communications protocol;

with the antenna and a second transceiver circuit in the wireless communications circuitry, communicating wirelessly in the communications frequency band according to a second communications protocol that is different than the first communications protocol;

when it is desired to simultaneously receive data with both the first and the second transceivers in a simultaneous receive mode, distributing radio-frequency signals from the antenna simultaneously to the first and second transceivers using a radio-frequency coupler and a switch, wherein the switch is coupled between the radio-frequency coupler and a transmit-receive port of the second transceiver circuit and wherein the switch is placed in a first position during the simultaneous receive mode; and when it is desired to transmit and receive data with the second transceiver circuit while not transmitting or receiving data with the first transceiver circuit, placing the wireless communications circuitry in a given mode of operation in which the first transceiver circuit is inactive and the second transceiver circuit is active and is transmitting and receiving data through the transmit-receive port and the switch and in which the switch is placed in its second position.

17. The method defined in claim 16 further comprising:

when it is desired to transmit wireless data through the antenna from the first transceiver, placing the wireless communications circuitry in a wireless local area network transmit mode of operation in which the first transceiver is active and transmits radio-frequency signals through the antenna.

18. The method defined in claim 16 further comprising:

when it is desired to transmit wireless data through the antenna from the first transceiver, placing the wireless communications circuitry in a wireless local area network transmit mode of operation in which the first transceiver is active and transmits radio-frequency signals through the antenna, wherein placing the wireless communications circuitry in the given mode in which the first transceiver circuit is inactive and the second transceiver circuit is active and is transmitting and receiving data and in which the switch is placed in the second position comprises placing the wireless communications circuitry in a Bluetooth transmission mode of operation in which the second transceiver is active and transmitting Bluetooth radio-frequency signals through the antenna.

19. The method defined in claim 16, wherein the wireless communications circuitry comprises an additional switch coupled between the radio-frequency coupler and the antenna, wherein the additional switch has at least first, second, and third positions, wherein the additional switch is coupled to at least one of the first and second transceiver circuits when it is placed in each of the first, second, and third positions, and wherein placing the wireless communications circuitry in the given mode of operation comprises conveying radio-frequency signals between the antenna and the second transceiver circuit through the switch and the additional switch and without passing through the radio-frequency coupler.

20. The method defined in claim 16, wherein the wireless communications circuitry comprises an additional switch coupled between the radio-frequency coupler and the antenna, wherein the additional switch has at least first, second, and third positions, wherein the additional switch is coupled to at least one of the first and second wireless transceiver circuits when it is placed in each of the first, second, and third positions, and wherein distributing the radio-frequency signals from the antenna simultaneously to the first and second transceiver circuits comprises distributing the radio-frequency signals from the antenna simultaneously to the first and second transceiver circuits through the switch, the additional switch, and the radio-frequency coupler.

* * * * *